United States Patent [19]

Crawford

[11] Patent Number: 5,551,551
[45] Date of Patent: Sep. 3, 1996

[54] ARTICLE COMBINER WITH MULTIPLE CONVEYING SURFACES AND MOVING GUIDES

[75] Inventor: William C. Crawford, Lynchburg, Va.

[73] Assignee: Simplimatic Engineering Company, Lynchburg, Va.

[21] Appl. No.: 506,689

[22] Filed: Jul. 25, 1995

[51] Int. Cl.$^6$ .................................................. B65G 47/12
[52] U.S. Cl. .......................................... 198/453; 198/448
[58] Field of Search .................................. 198/443, 448, 198/452, 453

[56] References Cited

U.S. PATENT DOCUMENTS

| | | |
|---|---|---|
| 1,716,968 | 6/1929 | May .................................... 198/453 |
| 2,389,696 | 11/1945 | Stiles . |
| 2,541,300 | 2/1951 | Silva ................................. 198/448 X |
| 2,560,995 | 7/1951 | Stiles ................................ 198/448 X |
| 2,656,910 | 10/1953 | Kraus et al. . |
| 2,743,807 | 5/1956 | McKune . |
| 3,592,324 | 7/1971 | Caunt . |
| 3,601,240 | 8/1971 | Dominici . |
| 3,610,396 | 10/1971 | Babunovic . |
| 4,252,232 | 2/1981 | Beck et al. . |
| 4,664,248 | 5/1987 | Goodman, Jr. et al. ............ 198/453 X |
| 4,889,224 | 12/1989 | Denker . |
| 4,974,720 | 12/1990 | Schoen ............................... 198/453 X |
| 5,129,504 | 7/1992 | Smith . |

FOREIGN PATENT DOCUMENTS

| | | |
|---|---|---|
| 2331781 | 1/1975 | Germany . |
| 2505333 | 8/1975 | Germany ............................. 198/453 |
| 3637250A | 6/1987 | Germany . |
| 6-24546 | 2/1994 | Japan .................................. 198/452 |

*Primary Examiner*—James R. Bidwell
*Attorney, Agent, or Firm*—St. Onge Steward Johnston & Reens

[57] ABSTRACT

A conveyor is provided for combining articles from a mass to a single file lane. The conveyor comprises a moving guide belt disposed over multiple, parallel conveying surfaces traveling at progressively increasing speeds toward the single file lane. The angle, speed, or both of the guide is selected to minimize article rotation.

15 Claims, 4 Drawing Sheets

ARTICLE COMBINER WITH MULTIPLE CONVEYING SURFACES AND MOVING GUIDES

FIELD OF THE INVENTION

The invention relates to a conveyor system for combining a mass of articles into a single file and, more particularly, to a conveyor system having multiple conveying surfaces moving at increasing speeds and a guide for moving the articles from surface to surface accelerating the articles into a single file.

BACKGROUND OF THE INVENTION

In conveyor systems for articles such as cans or bottles, it is often desired to combine a mass of articles into a singe file lane. One way of accomplishing this is to provide a stationary guide above the conveying surface which is aligned at an angle with respect to the direction of travel of chains, belts or other surfaces which are traveling at increasing speeds to urge the articles toward the single file lane. With this type of passive system, however, the articles often become jammed at the single file lane requiring them to be cleared Also, the jammed articles can damage the conveyor.

Jamming is frequently caused by articles which have been knocked over or "downed" during the single file combining process. Downed articles are often knocked over by the stationary guide which, in combination with the moving conveying surface, causes the articles to rotate as they are being urged towards the single-file article lane. This induced rotation, can cause the articles to become unstable, spin out of control and tip over thereby jamming the conveyor. The rotation is exacerbated at points along the guide where the article is transferring from a lower speed to a higher speed belt or surface which induces rotation in the same direction as the stationary guide.

In addition to stationary guides, numerous single filing and article orienting conveyor systems include moving guides.

U.S. Pat. No. 4,252,232 to Beck and U.S. Pat. No. 5,129,504 to Smith disclose vacuum transfer belts for removing a single file of articles from the mass. Smith also discloses an oscillatory guide for jostling articles into a single file.

Beck and German Patent DE 3637-250-A to Nagema both disclose systems including individual article pockets for creating the single file. In Nagema, the pockets are formed by an auger.

U.S. Pat. No. 2,389,696 to Stiles, U.S. Pat. No. 3,592,324 to Caunt, U.S. Pat. No. 3,610,396 to Babunovic, U.S. Pat. No. 4,889,224 to Denker and German DT 23 31 781 to Wieferig also disclose conveyor systems having a single moving guide traversing a conveying surface. The Stiles and Wieferig conveying surfaces comprise multiple belts or chains. The Stiles belts move at different speeds increasing toward the single file lane. The Babunovic and Stiles guides are designed to rotate articles on the premise that this rotation reduces or alleviates blockages.

U.S. Pat. No. 2,656,910 to Kraus, U.S. Pat. No. 2,743,807 to McKune and U.S. Pat. No. 3,601,240 to Dominici disclose devices having two moving guides for orienting/singulating articles from a single infeed conveyor.

What is desired, therefore, is a conveyor system for combining articles into a single file employing multiple moving guides which not only urge the articles across successively higher speed conveying surfaces but also minimize the induced rotation of the articles in contact with the moving guides to reduce jamming.

SUMMARY OF THE INVENTION

Accordingly, it is an object of the invention to provide a conveyor for reducing the rotation of articles as they are combined into a single file.

Another object of the invention is to provide a conveyor of the above character having a moving guide.

A further object of the invention is to provide a conveyor with the above character having multiple, parallel conveying surfaces traveling at increasing speeds.

Still another object of the invention is to provide a conveyor with the above character including multiple moving guides, each aligned at different angles with respect to the direction of travel of the conveying surfaces.

Yet another object of the invention to provide a conveyor with the above character wherein the guides move at different speeds.

These and other objects are achieved by provision of a conveyor comprising a single file lane, two or more conveying surfaces moving at progressively increasing speeds toward the single file lane, a guide traversing the conveying surfaces for urging articles toward the single file lane, and a motor for moving the guide at a speed selected to minimize article rotation and alleviate jams caused by downed articles. Preferably, the guides move at a speed selected so that articles rotate one direction at an upstream end and an opposite direction at a downstream end of the guide. Most preferably, the articles do not rotate.

Preferably, a second guide is provided which is aligned at a second angle or moves at a different speed or both as compared with the first guide.

A fixed guide is preferably also provided to contact articles only when they are tipping to aid in preventing downed articles.

The invention and its particular features and advantages will become more apparent from the following detailed description considered with reference to the accompanying drawings.

DETAILED DESCRIPTION OF THE INVENTION

Figure 5:
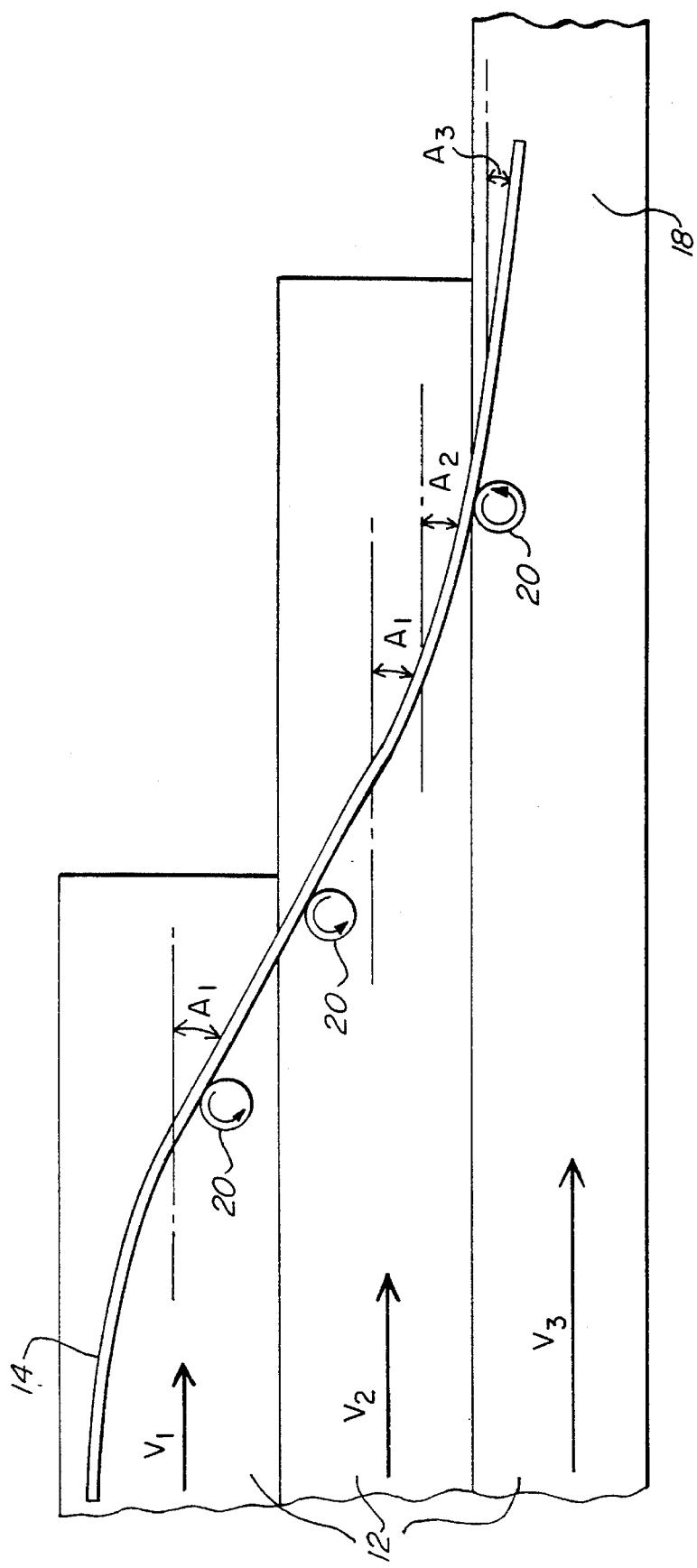
FIG. 5 is a top schematic view of a prior art conveyor having a plurality of belts moving at increasing speeds toward a single file lane and a fixed guide traversing the belts toward the lane.

Referring to FIG. 5, a prior art conveyor 10 includes one or more conveying surfaces or belts 12 which travel in the same direction but at increasing speeds from V1 to V2 and from V2 to V3. A stationary guide rail 14 urges the articles 16 toward the single file article lane 18 which travels at the highest speed V3. Articles 20 which contact guide rail 14 are caused to rotate by moving conveying surfaces 12 as indicated by the arrows.

The speed of rotation of the articles 20 is a function of the speed V1, V2, V3 of the conveying surfaces 12, the angle A1, A2, A3 that the guide rail 14 forms with the direction of travel of the conveying surfaces 12, the mass of articles 20, and the coefficients of friction of the conveying surfaces 12 and the guide rail 14. Generally, rotation varies proportionally with conveying surface speed V1, V2, V3 and inversely with the angle A1, A2, A3 to a point where the angle is small such that the frictional force between the article 20 and the guide rail 14 is insufficient to overcome the frictional resistance to rotation between the article 20 and the conveying surface 12.

For example, since speed V2 of the conveying surfaces 12 is greater than V1, articles 20 move along the guide rail 14 more quickly and, consequently, rotate more quickly when on the surface moving at speed V2. Similarly, where angle A2 is smaller than A1, articles 20 move along guide rail 14 more quickly and, consequently, rotate more quickly for a given belt speed. This induced rotation of articles 20 can cause them to become unstable and tip over causing a jam.

Figure 1:
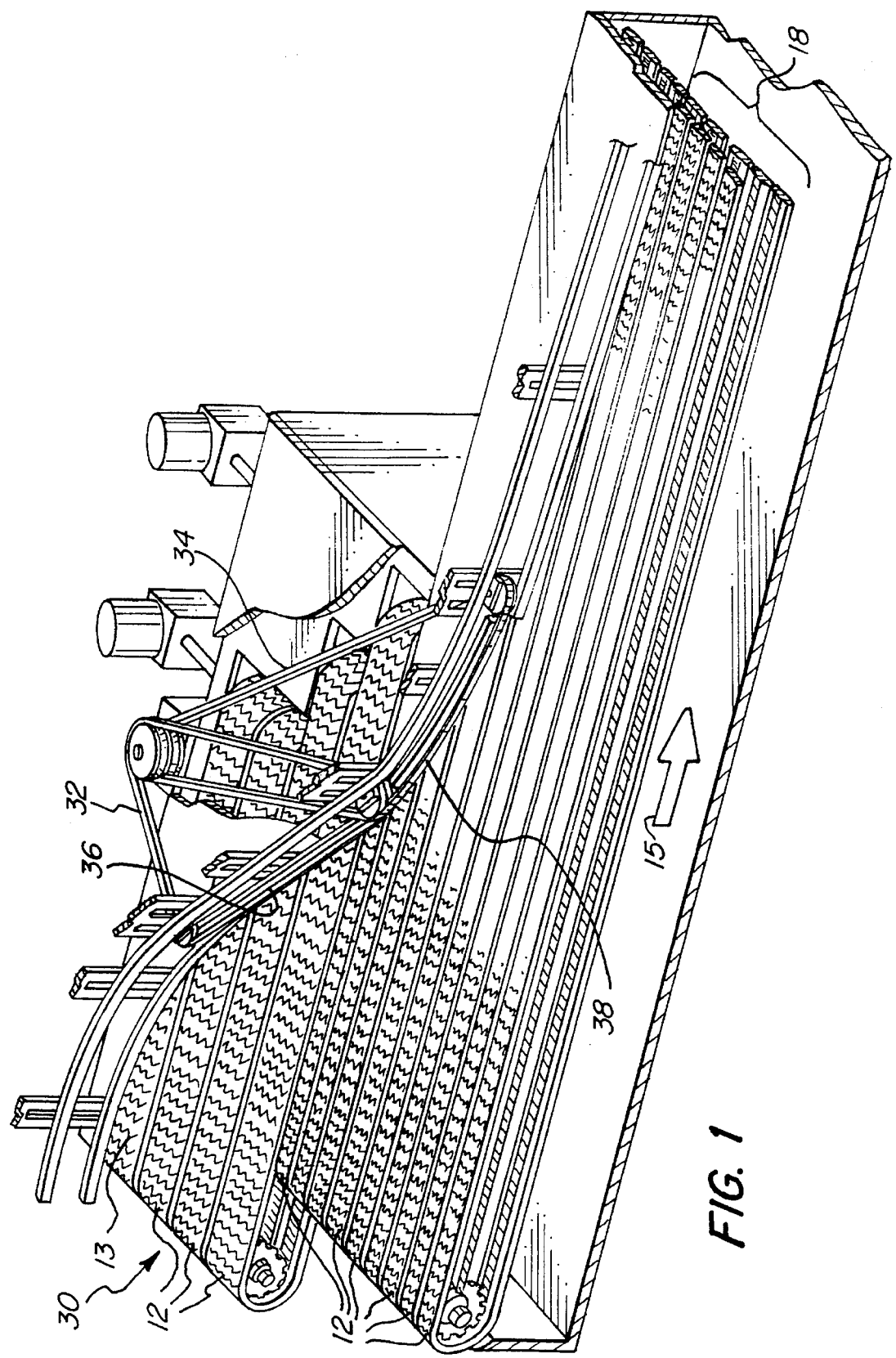
FIG. 1 is a front perspective view of the conveyor of the present invention partially cut away to show multiple, parallel conveying surfaces, and two moving guides aligned at different angles with respect to the direction of travel of the conveying surfaces.
Figure 2:
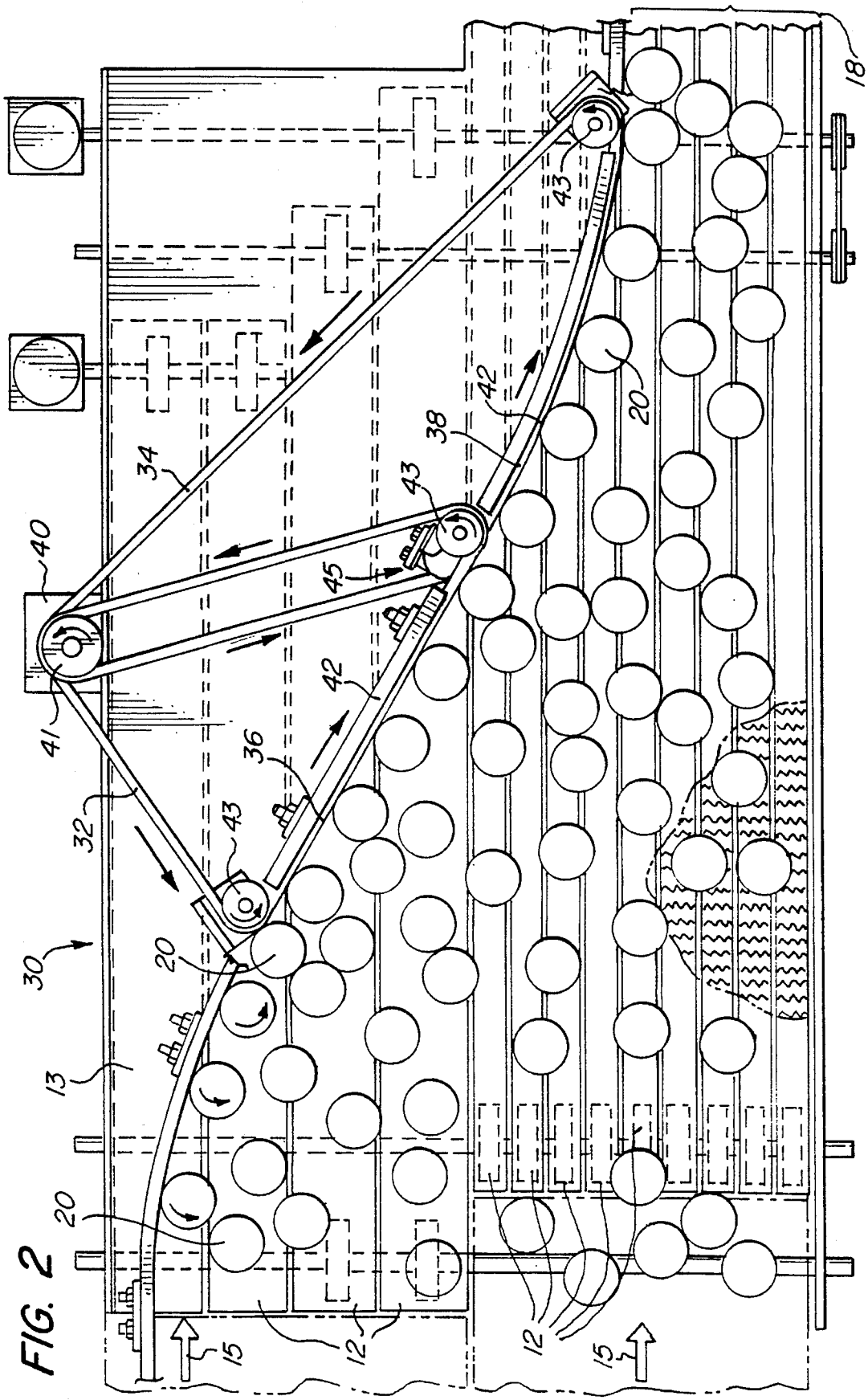
FIG. 2 is a top view of the conveyor of FIG. 1 showing the direction of circulation of the moving guides and the speed and direction of rotation of the articles at various points along the moving guides.

Referring to FIGS. 1–2, a conveyor 30 for combining a mass of articles into a single file in accordance with the invention is shown. Conveyor 30 includes a plurality of conveying surfaces or belts 12 which circulate in direction 15. The conveying surfaces travel at speeds which generally increase in a direction toward single file lane 18. Preferably, the speeds of all of the conveying surfaces 12 increase from the outside conveying surface 13 to the single file lane 18. However, it is understood that some belts 12 may circulate at the same speed as adjacent belts so long as the speed of a belt in single file lane 18 is greater than a speed of outside belt 13.

Conveyor 30 also includes moving guides 32, 34 which operate to minimize the rotation induced in the articles. Article contacting lengths 36, 38 of respective guides 32, 34 traverse conveyor belts 12 to urge articles 20 toward single file lane 18. Guides 32, 34 of the present invention are aligned at angles with respect to belts 12, and travel at speeds selected such that rotation of articles 20 is minimized over the contact length of the guide belts 32, 34.

Referring to FIG. 2, articles 20 on conveyor 30 of the present invention are transported by conveying surfaces 12. The guide belts 32, 34 have contact lengths 36, 38 over which they may be in contact with articles 20 on the conveying surface 12. The guide belts 32, 34 move in respective first and second directions across surfaces 12 toward single file article lane 18 to urge the articles 20 towards the single file article lane 18 and to minimize induced rotation in the articles 20.

The speed and angle of the guide belts 32, 34 are set such that the rotation of articles 20 over their contact lengths 36, 38 is minimized. If the contact length 36 is linear, as depicted for guide belt 32, and the conveying surfaces 12 over which the guide belt 32 is disposed are all traveling at the same speed, then the speed of the guide belt 32 may be adjusted such that all articles 20 in contact therewith will have little if any rotation.

If the contact length of a guide belt is not linear, as depicted for guide belt 34, and/or the conveying surfaces 12 over which it is disposed are not all traveling at the same speed, then it may not be possible to eliminate all rotation of articles 20 over the entire contact length 38 of the guide. Instead, the speed of the guide belt 34 is adjusted such that the rotation of articles over the contact length 38 thereof is minimized it. By "minimized" is meant that the speed of the guide belt 38 is adjusted such that, at some point, preferably near the middle of the contact length 38, articles 20 will not substantially rotate. It is understood that at an upstream end of a guide moving at the minimized speed, articles 20' may rotate slightly in a direction opposite the rotation induced by a stationary guide, and that at a downstream end of a guide moving at the minimized speed, articles 20 may rotate slightly in the induced direction. At points in between the ends of such a contact length, the rotation of the articles passes through zero. In this way, the rotation of articles 20 can be minimized throughout the contact length. It is understood that the number of different guide belts and the length of each contact length will vary depending upon the angle at which the guide traverses the conveying surfaces, the relative speeds of the adjacent surfaces, the width of the incoming mass of articles, the level of stability required by the articles, and other factors.

Figure 4:
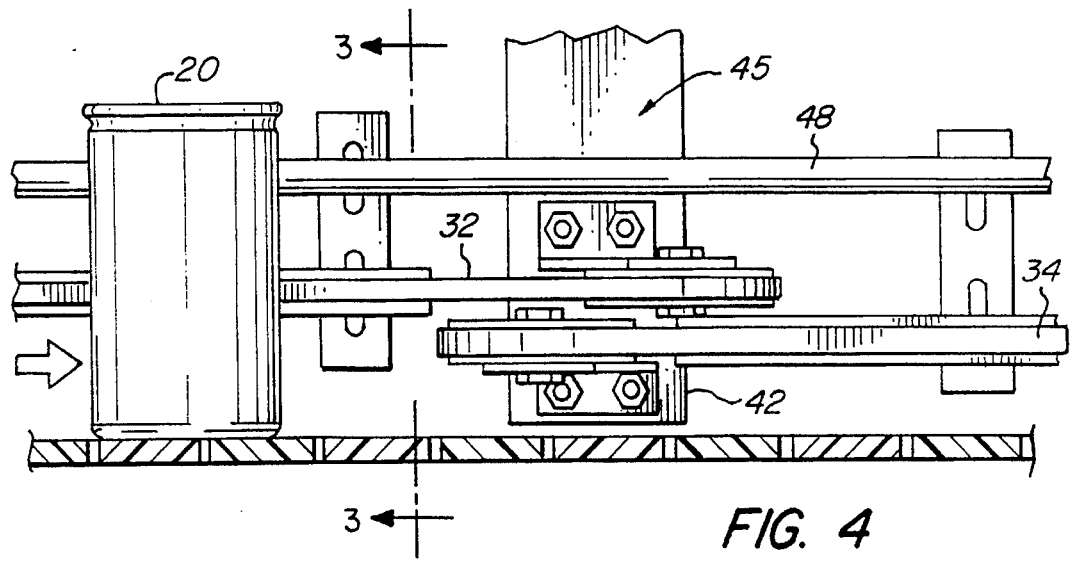
FIG. 4 is an enlarged, partial front elevation view of the conveyor of FIG. 1 showing the region of overlap of two adjacent moving guides.

Preferably, the guide belts 32, 34 are driven by a common motor 40 with reducing gears 41. The guide belts 32, 34 may be lead around passive pulleys 43 with support structure 42 therebetween. Referring to FIG. 4, guides 32, 34 overlap at 45 so as to provide continuous contact with articles 20 and smooth the transition between the guides running at different speeds.

Figure 3:
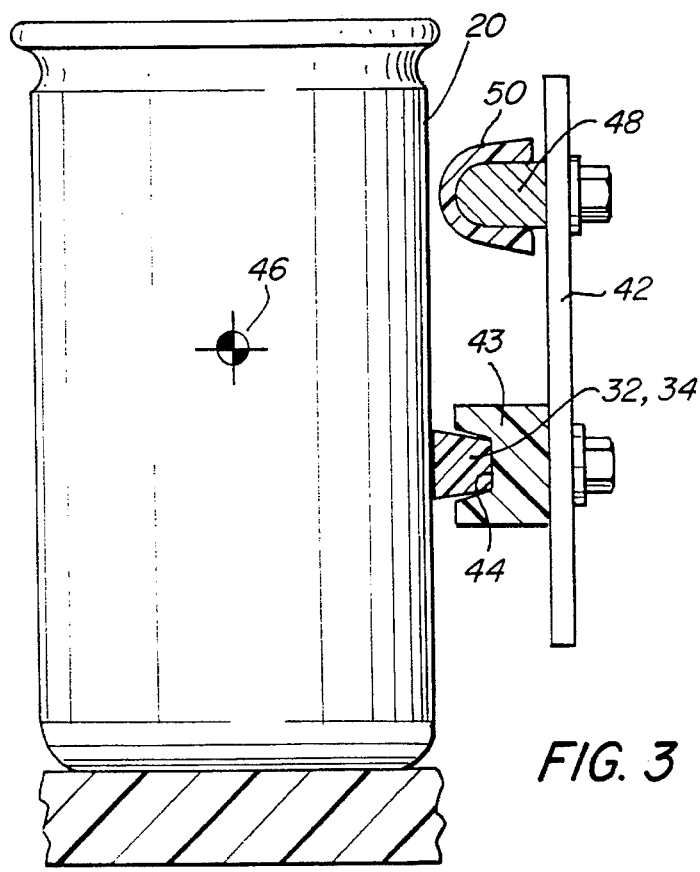
FIG. 3 is an enlarged side cross section view of the conveyor of FIG. 1 taken along plane 3—3 in FIG. 4 showing the cross-sectional shape of the guide.

Referring to FIG. 3, guide belts 32, 34 travel within a truncated V-shaped channel 44 connected to the support structure 42. Guide belt 32, 34 has a truncated V-shaped outer surface 43 to conform to the channel 44 and is comprised of a material with a high coefficient of friction, such as rubber, for gripping the articles to minimize rotation. Guide belt 32 contacts article 20 below the center of gravity 46 thereof so as to reduce the possibility of upsetting the article 20 upon contact.

The support structure 42 also supports a fixed guide rail 48 for providing added stability to the articles 20. Fixed guide 48 is set back a distance from the article and only contacts the article if it is tipping. This fixed guide rail 48 may have a covering 50 comprised of a material with a low coefficient of friction such a plastic, or teflon, or any similar material.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A conveyor for combining articles from a mass to a single file comprising:

a first conveying surface circulating at a first speed;

a second conveying surface circulating at a second speed greater than the first speed, said second conveying surface mounted adjacent said first conveying surface;

a first guide traversing said first and second conveying surfaces at a first angle to deflect articles from said first conveying surface toward said second conveying surface;

a second guide traversing said third conveying surface at a second angle; and a motor for moving said first at a first guide speed selected to minimize rotation of articles along said first guide extending at said first angle.

2. The conveyor of claim 1 wherein said motor moves said guide in a direction from said first conveying surface toward said second conveying surface.

3. The conveyor of claim 1 including a third conveying surface circulating at a third speed greater than the second speed, said third conveying surface mounted adjacent said second conveying surface.

4. The conveyor of claim 1 wherein said motor moves said second guide at a second guide speed different than the first guide speed to minimize rotation of articles along a portion of said second guide extending at said second angle.

5. The conveyor of claim 4 wherein said first and second guides overlap to provide a smooth transition between the first and second guide speeds.

6. The conveyor of claim 1 including a fixed guide mounted spaced apart from the articles to contact the articles only if they tip to aid in preventing them from being knocked over.

7. A conveyor for combining articles from a mass to a single file comprising:

a single file lane;

a plurality of conveying surfaces adjacent said single file lane, each said surface circulating in a first direction at speeds increasing with proximity to said single file lane;

a first guide traversing at least some of said plurality of conveying surfaces for urging articles toward said single file lane; and a motor for moving said first guide at a speed selected such that at an upstream end of said first guide the articles rotate in one direction and at a downstream end of said first guide the articles rotate in an opposite direction.

8. The conveyor of claim 7 including a second guide traversing at least some of said plurality of conveying surfaces for urging articles toward said single file lane and wherein said motor moves said second guide at a speed selected such that at an upstream end of said second guide the articles rotate in one direction, and at a downstream end of said guide the articles rotate in an opposite direction.

9. The conveyor of claim 8 wherein said first and second guides traverse said conveying surfaces at different angles.

10. The conveyor of claim 8 wherein said motor moves said first and second guides at different speeds.

11. The conveyor of claim 8 wherein said guides move at different speeds and intersect said conveying surfaces at different angles.

12. A conveyor for combining articles from a mass to a single file comprising:

a single file lane;

a plurality of conveying surfaces adjacent said single file lane, each said surface circulating in a first direction at speeds increasing with proximity to said single file lane;

a first guide traversing at least some of said plurality of conveying surfaces for urging articles toward said single file lane;

a second guide traversing at least some of said plurality of conveying surfaces for urging articles towards said single file lane; and a motor for moving said first and second guides at a speed selected to minimize rotation of the articles.

13. The conveyor of claim 12 wherein said first and second guides traverse said conveying surfaces at different angles.

14. The conveyor of claim 12 wherein said motor moves said first and second guides at different speeds.

15. The conveyor of claim 12 wherein said guides move at different speeds and intersect said conveying surfaces at different angles.

* * * * *